United States Patent [19]

Saunders

[11] Patent Number: 4,519,467
[45] Date of Patent: May 28, 1985

[54] LOWER RADIATOR MOUNT

[75] Inventor: James W. Saunders, Burlington, Wash.

[73] Assignee: Paccar Inc., Bellevue, Wash.

[21] Appl. No.: 438,411

[22] Filed: Nov. 1, 1982

[51] Int. Cl.³ .............................................. B60K 11/04
[52] U.S. Cl. ................................... 180/68.4; 165/41; 165/67; 165/69; 248/188.4
[58] Field of Search .................. 180/68.4; 165/41, 53, 165/67, 68, 69; 248/188.4, 661, 680

[56] References Cited

U.S. PATENT DOCUMENTS

| | | | |
|---|---|---|---|
| 1,660,671 | 2/1928 | Gurney | 180/68 |
| 1,693,234 | 11/1928 | Higgins | 180/68 |
| 1,699,826 | 1/1929 | Witte | 180/68 |
| 1,737,353 | 11/1929 | Bock | 180/68 |
| 1,768,479 | 6/1930 | Holzhauer | 180/68 |
| 2,117,919 | 5/1938 | Summers | 248/613 |
| 2,147,660 | 2/1939 | Loewus | 248/358 |
| 2,715,448 | 8/1955 | Zeeb | 180/68 |
| 3,086,742 | 4/1963 | Severson | 248/588 |
| 3,248,076 | 4/1966 | Ferguson | 180/68 |
| 3,361,410 | 1/1968 | Messer | 248/188.4 |
| 3,669,393 | 6/1972 | Paine et al. | 248/188.4 |
| 3,788,419 | 1/1974 | Drone et al. | 180/68 R |
| 3,971,537 | 7/1976 | Winkle et al. | 248/188.4 |
| 4,061,298 | 12/1977 | Kober | 248/188.4 |

Primary Examiner—Joseph F. Peters, Jr.
Assistant Examiner—Kenneth R. Rice
Attorney, Agent, or Firm—Owen, Wickersham & Erickson

[57] ABSTRACT

An easily adjustable lower radiator mount for a cab-over-engine truck, for adjusting the clearance between the radiator and a tunnel through the tilt cab. The mount lies behind a front bumper. The radiator bottom member has a pair of vertical, upwardly extending blind threaded openings, while the truck frame has a cross member below the bottom member provided with a wide, internally threaded opening in line with each blind opening. A threaded stud extends up from below the cross member, through each wide opening, and is threaded into each blind opening. A tubular adjusting member, is threaded into the wide threaded opening and has a flange extending out radially from its upper end; it also has a lower externally keyed portion, in which a lug nut is internally keyed. The lug nut has a keyed exterior for engagement by a wrench. Upper spacing means bears against the radiator bottom member and surrounds the stud, while lower spacing means bears against a locking nut at the lower end of the stud. A resilient portion of the upper spacing means lies axially between the flange and the radiator, and a similar resilient portion of the lower spacing means lies axially between and bears against the lug nut and the locking nut.

12 Claims, 6 Drawing Figures

LOWER RADIATOR MOUNT

This invention relates to the mounting of the lower end of a radiator in a cab-over-engine truck.

BACKGROUND OF THE INVENTION

In cab-over-engine trucks, the radiator is typically (and usually necessarily) mounted to the frame just to the rear of the front bumper. When it comes to adjusting the position of the radiator within the frame, this adjustment is awkward, since the bumper obscures the frontal access to the radiator lower mounting assembly.

The truck cab is shaped to provide a tunnel which enables the cab to be swung forward over the engine; this tunnel comprises an open bottom, two side walls and a top wall. The radiator must therefore fit on the truck frame in such a way that there is adequate clearance between it and the sides and top of the cab tunnel, both when the cab is in its normal position and when it is tilted forward. Radiator adjustment in roll is required in order to center the radiator within the cab tunnel and so keep the radiator from rubbing on the cab tunnel, particularly when the cab is in its normal position. The normal clearance is about 27.5±3 mm.

Heretofore, the roll adjustment has been achieved by placing a shim or shims between a lower rubber mount and the radiator's bottom tank. In order to install or remove such shims one had first to remove the bumper, and this removal typically involved taking out eight bolts. Only when the bumper has been removed could one loosen the locking nut holding the lower radiator mount to the frame, and then, by using a pry bar, raise the radiator off the mounts to enable insertion of the shims. After that, the radiator had to be lowered and checked for clearance. If the clearance was not sufficient at any point or was too large, then the process of raising the radiator and installing or removing shims was repeated.

An object of the present invention is to provide a lower mount structure for a tilt-cab truck radiator which enables adjustment without having to remove the bumper and without having to use a pry bar or having to insert or remove shims.

Another object is to provide an improved radiator lower mount enabling rapid and accurate adjustment and retention of any adjustment made.

SUMMARY OF THE INVENTION

The invention provides an easily adjustable lower radiator mount for a cab-over-engine truck. The truck frame pivotally supports a tilt cab having a tunnel therethrough, and a front bumper is provided on the frame. The truck's radiator is mounted on the frame within and at the front end of the tunnel, with correct clearance to be provided from the tunnel at sides and top, and the lower portion of the radiator is behind and in line with the bumper.

The radiator has a bottom member with a pair of vertical, upwardly extending blind threaded openings extending up thereinto on each side of the radiator, and the frame has a cross member spaced downwardly below this bottom member and having a wide opening in line with each blind opening. A threaded stud extends up from below the frame cross member into and through each wide opening in the cross member and is threaded into the respective blind opening.

While the wide opening through the frame cross member might be internally threaded, it is usually more convenient to provide a tubular internally threaded support member and weld it into each wide opening of the frame cross member. Into that support member fits a flanged tubular adjusting member having a cylindrical portion with an upper externally threaded portion that is threaded into the support member. This adjusting member, which is the member that determines the location of the radiator within the frame, has a lower externally keyed portion and a flange extending radially out from the upper end of the upper portion. A lug nut is internally keyed to and surrounds the lower keyed portion, and it has a keyed exterior.

An upper spacing means bears against the radiator bottom member and surrounds the stud there. This upper spacing member may comprise an upper washer that bears against the bottom member and an upper bushing which bears against the upper washer. The upper bushing has a metal upper sleeve extending down from it and encircling the stud. It also has a resilient portion bonded to the upper sleeve; the resilient portion includes an upper portion lying axially between the flange and the upper washer, while a narrower lower resilient portion lies radially between the upper sleeve and the cylindrical portion of the adjusting member.

There is also a lower spacing means, which may include a lower bushing having a metal lower sleeve and a resilient portion bonded to said lower sleeve. A narrow upper portion of the resilient portion lies radially between the lower sleeve and the adjusting member, while a thicker lower resilient portion may lie axially between and bearing against the lug nut and a lower washer, which itself bears on a locking nut that is threaded onto the lower end of the stud.

With this structure, there is adequate access from below, so that there is no need to remove the bumper. Moreover, all that need be done to achieve adjustment at each stud is to loosen the locking nut, apply a wrench to the keyed exterior of the lug nut, and turn it to raise or lower the adjusting member so as to raise or lower the height of the radiator relative to the frame. When the radiator is in the desired position, the locking nut is tightened.

DESCRIPTION OF A PREFERRED EMBODIMENT

Figure 1:
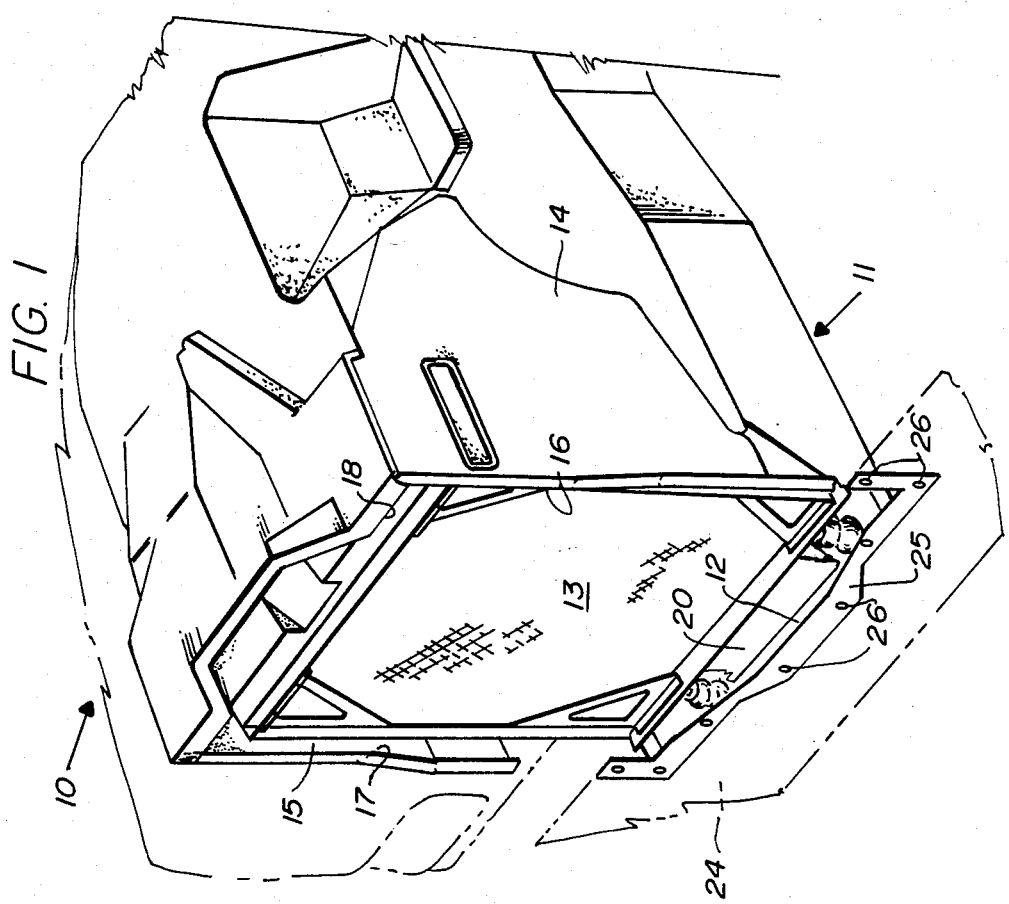
FIG. 1 is a fragmentary view in perspective of the front end of a partially assembled cab-over-engine truck with part of the cab shown and the bumper shown in phantom. This view shows the radiator mounted in accordance with the principles of the invention.
Figure 6:
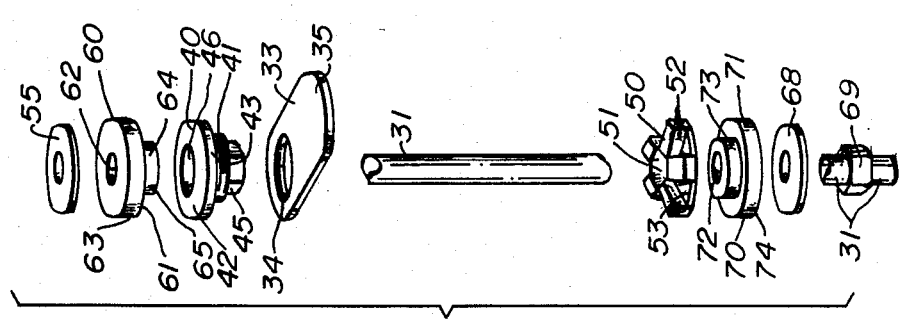
FIG. 6 is an exploded view of the mount assembly of FIG. 3 on a somewhat smaller scale.
Figure 2:
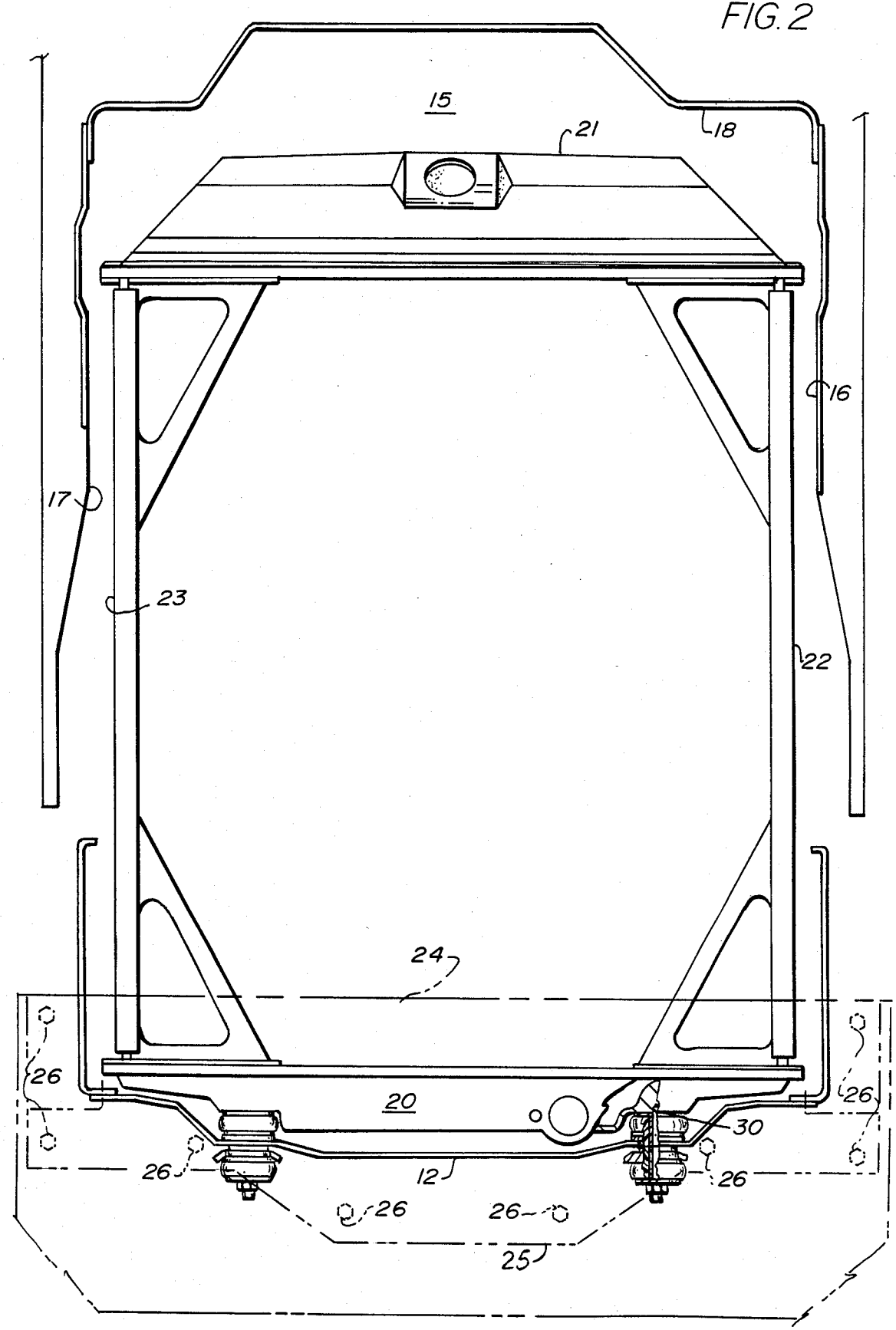
FIG. 2 is a view in front elevation of a portion of the cab and truck showing the radiator installed according to the principles of the invention, within the cab tunnel and to the rear of the bumper. The bumper is shown in phantom, and the lower radiator mount at one side is broken away and shown partly in section.

A typical cab-over-engine truck 10 (shown only fragmentarily in FIG. 1) has a main frame 11 that includes a bottom cross member 12 on which a radiator 13 is mounted. The truck 10 has a cab 14 (only partly shown) located over the engine and adapted to tilt forward when access to the engine is required. Therefore, the cab 14 is provided with a tunnel 15 (see especially FIG. 2) open at the bottom and having side walls 16 and 17 and an upper wall 18. It is important for the radiator 13 to be installed with proper clearance in the tunnel 15.

The radiator 13 is provided with a lower end or bottom tank portion 20, (FIG. 2) and upper end 21, and side walls 22 and 23, all of which must be properly adjusted with respect to the tunnel 15 and its walls 16, 17, and 18. In front of the radiator 13 there may be a grille, which is not shown here, and below that there is a bumper 24 shown in phantom in FIGS. 1 and 2, and secured to the bottom cross-member 12 thru its front flange 25, shown in hidden lines in FIG. 2, by a set of bolts 26, typically eight of them. Thus, to remove the bumper 24 all these bolts 26 must first be removed. It will be seen that the lower tank 20 of the radiator 13 lies to the rear of the bumper 24 and below the top of it and above the bottom of it, so that access to the member 13 from the front cannot be obtained without removal of the bumper 24. However, access from the bottom is possible without such removal.

In the present invention the lower tank 20 is provided with two blind threaded openings 30, one near each end, both extending up from below vertically. Into each opening 30 is threaded a stud 31. The stud 31 extends out below the lower tank 20 and through a wide opening 32 in the frame cross member 12 and below the cross member 12 too.

The opening 32 in the frame cross member 12 is aligned with the blind opening 30 and is much larger in diameter than the opening 30. Into this opening may be welded (or otherwise secured) a support member 33 having an interior threaded axial portion 34, and preferably having a radially extending flange 35 at its upper end. The purpose of the support member 33 is to provide a threaded opening much larger than the opening 30.

Into this support member 33 is threaded a tubular adjustment member 40 having an upper exteriorly threaded portion 41 threaded into the interiorly threaded portion 34 of the member. The member 40 has a radially outwardly extending flange 42 at its upper end that overlies the flange 35, and it has a generally cylindrical portion 43 which includes the portion 41 and also a lower inset portion 44 which may have an hexagonal or otherwise keyed exterior wall 45. An axial opening 46 through the member 44 is preferably cylindrical and is still much wider than the opening 30.

A lug nut 50 having a keyed, e.g. hexagonal, inner opening 51, is engaged with the keyed portion 44, and is provided with an upper outer keyed portion 52 enabling engagement by a wrench. Below that is a bearing portion 53. The lug nut 50 enables upward and downward movement of the adjusting member 40 by use of a simple hand or powered wrench.

Figure 5:
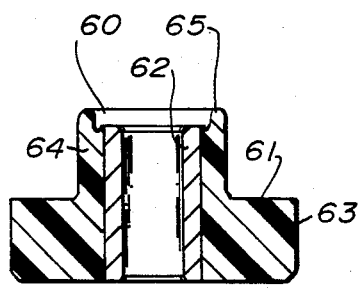
FIG. 5 is a view in section of one of the bushings in its relaxed position before installation.

Preferably, an upper washer 55 bears on the lower surface 56 of the tank 20 around the blind opening 30. Bearing against the washer 55 is an upper bushing 60 (see FIG. 5 where the bushing 60 is inverted) comprising a resilient, synthetic elastomer portion 61 bonded to a metal sleeve 62, which encircles the stud 31. The washer 55 and the bushing 60 considered together constitute upper spacing means, resiliently maintaining the distance between the flange 42 and the bottom member 20 of the radiator 13. The resilient portion 61, which damps vibrations, has a relatively thick upper portion 63 lying between the upper washer 55 and the flange 42. A thinner portion 64 extends down beyond the metal sleeve 62 to a lower end 65, which lies inside the cylindrical portion 43 of the adjusting member 40. The outer diameter of the portion 64 is purposely made enough smaller than the inner diameter of the axial opening 46 to make installation easy, a drop-through, while later tightening forces the lower end 65 upward until there is metal-to-metal engagement, the elastomer flowing to fill the space between the sleeve 62 and the adjusting member 40.

A lower washer 68 bears against a lock nut 69 that is threaded onto the lower end of the stud 31. The lower bushing 70 may be identical to the upper bushing 60. The washer 68 and bushing 70 together comprise lower spacing means, keeping the distance from the lock nut 69 to the lug nut 50 constant. The bushing 70 comprises a resilient vibration-damping portion 71 bonded to a metal sleeve 72, is essentially the manner of the bushing 60. It is installed in inverted position, resting on the washer 68, so as to provide a narrow upper resilient portion 73 fitting inside the lower portion of the adjusting member 40 and a lower, wider and thicker resilient portion 74 bearing up against the lug washer portion 53 of the lug nut 50, supporting it and ensuring its engagement with the adjustment member 40. When the locking nut 69 is tightened, the metal sleeve 72 bears against the metal sleeve 62, and the resilient portion 73 flows and snugly fills the space between the sleeve 72 and the adjusting member 40. When the locking nut 69 is fully tight, the positions of all members are firmly retained.

Figure 3:
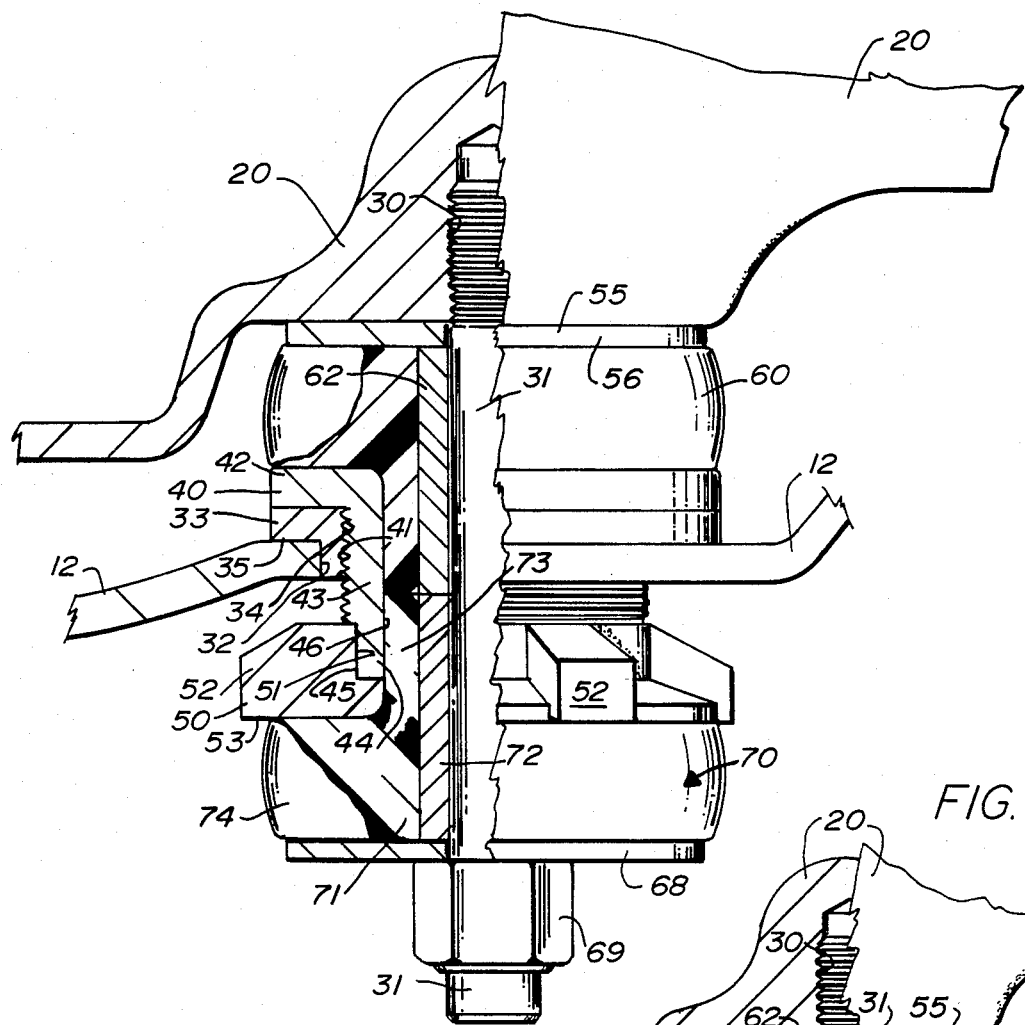
FIG. 3 is a much enlarged view of one of the lower radiator mounts, the two mounts being identical. The assembly is shown with the radiator in its lowest position relative to the frame.
Figure 4:
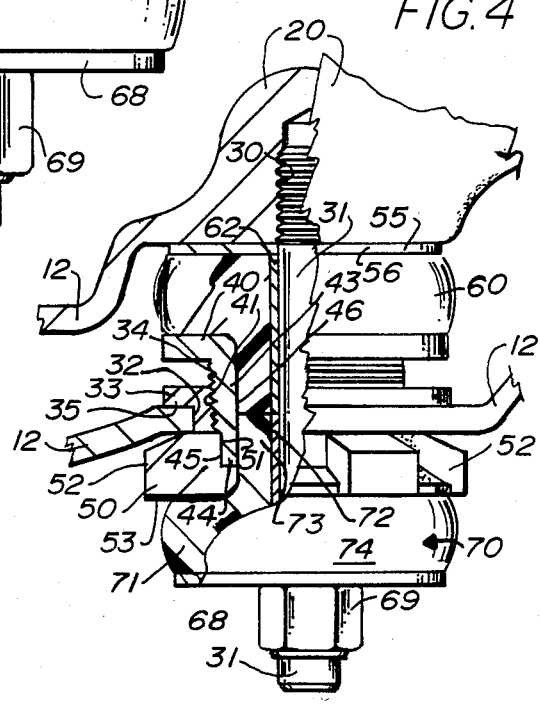
FIG. 4 is a similar view on a smaller scale with the assembly shown so that the radiator is in its highest position relative to the frame.

With this device the roll of the radiator 13 may be adjusted easily without removing the bumper 24. To do this, the locking nut 69 is loosened, and then the lower mount or tank 20 can be raised by applying a wrench to the lug nut 50 so as to turn the adjusting member 40 to either raise or lower the adjusting member 40, which acts through the bushing 60 and the washer 55 to raise or lower the tank 20 relative to the frame cross member 12. A standard open-end wrench can be used for this purpose. For example, the lug nut 50 may be turned in one direction so that the adjusting member 40 may rise from its FIG. 3 position forcing the upper bushing 60 upwardly until the radiator 20 is in the desired position on one side. The extreme upper position is shown in FIG. 4, and the radiator can assume any position in between those shown in FIGS. 3 and 4. When the locking nut 69 is tightened the adjustment is completed, and the assembly will retain the new position. Similar adjustment is made to the other side either simultaneously or in sequence.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

I claim:

1. An easily adjustable lower radiator mount enabling adjustment from the front of the vehicle without having to remove the vehicle's bumper, for a radiator having a bottom member with a pair of vertical, upwardly extending blind threaded openings extending up thereinto, said bottom member being supported by a frame cross member spaced below said bottom member and provided with a threaded wide opening vertically in line with and of greater diameter than each said blind opening, said mount comprising:
   a threaded stud extending up from below said frame cross member into and through each said wide opening and threaded into said blind opening and having a locking nut adjacent its lower end,
   a flanged tubular adjusting member having an externally threaded portion threaded into said wide opening, a lower externally keyed portion, and an upper flange extending out radially from its upper end,
   a lug nut internally keyed to and surrounding said lower keyed portion, and having a keyed exterior,
   upper spacing means bearing against said radiator bottom member, with a rigid upper sleeve around said stud and a resilient portion bonded thereto and having a thick portion lying axially between said flange and said bottom member,
   lower spacing means bearing against said locking nut at the lower end of said stud, with a rigid lower sleeve around said stud and a resilient portion bonded to said lower sleeve and having a thick portion lying axially between said lug nut and said locking nut,
   whereby said locking nut can be loosened and a wrench applied to said lug nut to turn said adjusting member and thereby to change the spacing between said bottom member and said frame cross member, followed by tightening said locking nut.

2. The mount of claim 1 wherein each of said upper and lower spacing means comprises a washer at one end and a bushing bearing against said washer, said bushing having said rigid sleeve and said resilient portion having a thick portion abutting said washer and a narrower portion radially between said sleeve and said adjusting member.

3. The mount of claim 1 wherein said threaded wide opening is provided by a tubular internally threaded support member welded to said frame in a wider opening of said cross member.

4. An easily adjustable lower radiator mount for adjusting a radiator installed in a vehicle from the front of the vehicle without removing the vehicle's bumper, for use with a radiator having a bottom member with a pair of vertical, upwardly extending blind threaded openings extending up thereinto, said bottom member being supported by a frame cross member spaced below said bottom member and provided with a threaded wide opening vertically in line with and of greater diameter than each said blind opening, said mount comprising:
   a threaded stud extending up from below said frame cross member into and through each said wide opening and threaded into said blind opening and having a locking nut adjacent its lower end,
   a flanged tubular adjusting member having a cylindrical portion with an upper externally threaded portion threaded into said wide opening, a lower externally keyed portion, and a flange extending radially outward from the upper end of said upper portion,
   a lug nut internally keyed to and surrounding said lower keyed portion, and having a keyed exterior,
   upper spacing means bearing against said radiator bottom member with a rigid upper sleeve around said stud and a resilient portion bonded to said upper sleeve and having a thick portion lying axially between said flange and said bottom member and a narrower lower portion lying radially between said upper sleeve and said cylindrical portion of said adjusting member, and
   lower spacing means bearing against said locking nut at the lower end of said stud, with a rigid lower sleeve around said stud and a resilient portion bonded to said lower sleeve and having a narrower upper portion bearing against said upper spacing means and lying radially between said lower sleeve and said adjusting member, and a thicker lower portion lying axially between said lug nut and said locking nut,
   whereby said locking nut can be loosened and a wrench applied to said lug nut to turn said adjusting member and thereby to change the spacing between said bottom member and said frame cross member, followed by tightening said locking nut.

5. The mount of claim 4, wherein said upper spacing means comprises:
   an upper washer bearing against said radiator bottom member and surrounding said stud there, and
   an upper bushing bearing against said upper washer and having a metal upper sleeve extending down from it and encircling said stud, and having a thick upper resilient portion bonded to said upper sleeve and lying axially between said flange and said upper washer and a narrower resilient lower portion radially between said upper sleeve and said cylindrical portion of said adjusting member.

6. The mount of claim 5 wherein said lower spacing means comprises:
   a lower washer bearing against said nut at the lower end of said stud, and
   a lower bushing having a metal lower sleeve and a narrow upper resilient portion bonded to said lower sleeve and bearing against said upper bushing and lying radially between said lower sleeve and said adjusting member, and a thicker lower resilient portion surrounding and bonded to said lower sleeve and lying axially between and bearing against said lug nut and said lower washer.

7. The mount of claim 4 wherein said threaded wide opening comprising a tubular internally threaded support member welded to said frame in an opening through said cross member.

8. A vehicle radiator to which access is partially barred by the vehicle's bumper, so that the adjustment may be done from the front end of the vehicle without removal of the bumper, said mount being an easily adjustable lower radiator mount for a radiator having a bottom member with a pair of vertical, upwardly extending blind threaded openings extending up thereinto, said bottom member being supported by a frame cross member spaced below said bottom member and having a wide opening vertically in line with each said blind opening, said mount comprising:
   a threaded stud extending up from below said frame cross member into and through each said wide opening and threaded into said blind opening and having a locking nut adjacent its lower end, a tubular internally threaded support member welded to said frame in each said wide opening, a flanged tubular adjusting member having a cylindrical portion with an upper externally threaded portion threaded into said support member, a lower externally keyed portion, and a flange extending radially outward from the upper end of said upper portion, a lug nut internally keyed to and surrounding said lower keyed portion, and having a keyed exterior, an upper washer bearing against said radiator bottom member and surrounding said stud there, a lower washer bearing against said nut at the lower end of said stud, an upper bushing bearing against said upper washer and having a metal upper sleeve extending down from it and encircling said stud, and having a thick upper resilient portion bonded to said upper sleeve and lying axially between said flange and said upper washer and a narrower resilient lower portion radially between said upper sleeve and said cylindrical portion of said adjusting member, and a lower bushing having a metal lower sleeve and a narrow upper resilient portion bonded to said lower sleeve and bearing against said upper bushing and lying radially between said lower sleeve and said adjusting member, and a thicker lower resilient portion surrounding and bonded to said lower sleeve and lying axially between and bearing against said lug nut and said lower washer.

9. An easily adjustable lower radiator mount assembly for a vehicle having a bumper partially barring access to the radiator mount, comprising:

a radiator having a front and a bottom member with a pair of vertical, upwardly extending blind threaded openings extending up thereinto, a frame cross member spaced below said bottom member and provided with a threaded wide opening vertically in line with and of greater diameter than each said blind opening, a threaded stud extending up from below said frame cross member into and through each said wide opening and threaded into said blind opening and having a locking nut adjacent its lower end, a flanged tubular adjusting member having a cylindrical portion with an upper externally threaded portion threaded into said wide opening, a lower externally keyed portion, and a flange extending radially outward from the upper end of said upper portion, a lug nut internally keyed to and surrounding said lower keyed portion, and having a keyed exterior, upper spacing means bearing against said radiator bottom member with a rigid upper sleeve around said stud and a resilient portion bonded thereto and having a thick portion lying axially between said flange and said bottom member and a narrower lower portion lying radially between said upper sleeve and said cylindrical portion of said adjusting member, and lower spacing means bearing against said locking nut at the lower end of said stud, with a rigid lower sleeve around said stud and a resilient portion bonded to said lower sleeve and having a narrower upper portion bearing against said upper spacing means and lying radially between said lower sleeve and said adjusting member, and a thicker lower portion lying axially between said lug nut and said locking nut, whereby said locking nut can be loosened from the front of the radiator without having to remove the bumper, and a wrench can be applied to said lug nut to turn said adjusting member and thereby to change the spacing between said bottom member and said frame cross member, followed by tightening said locking nut.

10. The assembly of claim 9 wherein said threaded wide opening is provided by a tubular internally threaded support member welded to said cross member in an opening therethrough.

11. The assembly of claim 9, wherein said upper spacing means comprises:

an upper washer bearing against said radiator bottom member and surrounding said stud there, and an upper bushing bearing against said upper washer and having a metal upper sleeve extending down from it and encircling said stud, and having a thick upper resilient portion bonded to said upper sleeve and lying axially between said flange and said upper washer and a narrower resilient lower portion radially between said upper sleeve and said cylindrical portion of said adjusting member.

12. The assembly of claim 10 wherein said lower spacing means comprises:

a lower washer bearing against said nut at the lower end of said stud, and a lower bushing having a metal lower sleeve and a narrow upper resilient portion bonded to said lower sleeve and bearing against said upper bushing and lying radially between said lower sleeve and said adjusting member, and a thicker lower resilient portion surrounding and bonded to said lower sleeve and lying axially between said bearing against said lug nut and said lower washer.

* * * * *